(12) United States Patent
Wang et al.

(10) Patent No.: US 10,334,084 B2
(45) Date of Patent: Jun. 25, 2019

(54) COMMUNICATION METHOD AND SYSTEM BASED ON ASSEMBLED COMMUNICATION PROTOCOL STACK

(71) Applicant: INSTITUTE OF ACOUSTICS, CHINESE ACADEMY OF SCIENCES, Beijing (CN)

(72) Inventors: Lingfang Wang, Beijing (CN); Jinlin Wang, Beijing (CN)

(73) Assignee: INSTITUTE OF ACOUSTICS, CHINESE ACADEMY OF SCIENCES, Beijing (CN)

( * ) Notice: Subject to any disclaimer, the term of this patent is extended or adjusted under 35 U.S.C. 154(b) by 197 days.

(21) Appl. No.: 15/328,028

(22) PCT Filed: Dec. 10, 2014

(86) PCT No.: PCT/CN2014/093470
§ 371 (c)(1),
(2) Date: Jan. 22, 2017

(87) PCT Pub. No.: WO2016/011764
PCT Pub. Date: Jan. 28, 2016

(65) Prior Publication Data
US 2017/0223147 A1 Aug. 3, 2017

(30) Foreign Application Priority Data
Jul. 25, 2014 (CN) .......................... 2014 1 0361515

(51) Int. Cl.
*G06F 15/16* (2006.01)
*H04L 29/06* (2006.01)

(52) U.S. Cl.
CPC ............ *H04L 69/161* (2013.01); *H04L 29/06* (2013.01)

(58) Field of Classification Search
CPC ............................ H04L 69/161; H04L 29/06
(Continued)

(56) References Cited

U.S. PATENT DOCUMENTS 5,903,754 A * 5/1999 Pearson ................. H04L 29/06
709/230
6,304,574 B1 * 10/2001 Schoo ..................... H04L 29/06
370/466
(Continued)

FOREIGN PATENT DOCUMENTS

CN 101599854 A 12/2009

*Primary Examiner* — Bharat Barot
(74) *Attorney, Agent, or Firm* — Gokalp Bayramoglu

(57) ABSTRACT

The present invention provides a communication method based on an assembled communication protocol stack. The method comprises: construct protocols to form protocol modules, and place the protocol modules into a protocol module library; extract required protocol modules from the protocol module library, and assemble the extracted protocol modules to form a communication protocol stack; install the assembled communication protocol stack into a protocol stack running device; and an application on the protocol stack running device implements data communication by using the installed protocol stack. The specific process of constructing protocol modules comprises: constructing execution codes of protocols corresponding to an operating system to form protocol modules; and defining PDUs, that is, defining a corresponding data length and a data structure when each protocol module is in a mutual input/output relationship with other protocol modules in the protocol module library.

7 Claims, 3 Drawing Sheets

(58) Field of Classification Search
USPC .................................. 709/230; 370/466–467
See application file for complete search history.

(56) References Cited

U.S. PATENT DOCUMENTS

| | | | | |
|---|---|---|---|---|
| 7,552,441 B2* | 6/2009 | Lim | ........................ | H04L 69/16 |
| | | | | 709/250 |
| 7,848,322 B2* | 12/2010 | Oved | ...................... | H04L 69/16 |
| | | | | 370/466 |
| 8,645,558 B2* | 2/2014 | Pope | ..................... | H04L 69/161 |
| | | | | 709/230 |
| 2002/0107955 A1* | 8/2002 | Rawson, III | ............ | H04L 29/06 |
| | | | | 709/250 |
| 2005/0128957 A1* | 6/2005 | Yuki | ....................... | H04L 69/08 |
| | | | | 370/254 |

\* cited by examiner

COMMUNICATION METHOD AND SYSTEM BASED ON ASSEMBLED COMMUNICATION PROTOCOL STACK

CROSS REFERENCE TO RELATED APPLICATIONS

This application is the national phase entry of International Application No. PCT/CN2014/093470 filed on Dec. 10, 2014, which is based upon and claims priority to Chinese Patent Application No. 201410361515.4, filed on Jul. 25, 2014, the entire contents of which are incorporated herein by reference.

TECHNICAL FIELD

The present invention relates to the field of network technologies, and particularly to the development of future network protocol stack.

BACKGROUND OF THE INVENTION

In the field of future networks, researchers in the United States, Europe, Japan and the like, as well as in China are all making explorations on network architectures and the like. A network architecture is finally to be decomposed into different functional components no matter how advanced the network architecture is, such that a respective protocol stack can be developed. At present, in the research of future network technologies, SDN (Software Defined Network) is universally used as an underlying component. On this basis, targeted developments are made. In most cases, almost all the protocol stack modules are developed, which brings about problems such as low development efficiency, thereby affecting the development of subsequent applications and the network tests that support new protocols.

No matter which kind of network architecture is employed, the final implementation thereof is carried out by software. In the software development technology, there are a process-oriented development method, an object-oriented development method and a modular development method. In terms of software reusability, the object-oriented development method is better. Many common functions such as transport, security, mobility and so on are identifiable in an internet model based on TCP/IP or OSI seven-layer model, even in a protocol stack model to be developed. Moreover, many such functions might be implemented at multiple layers on today's protocol stack, which may lead to a problem of repeated development.

For problems of slow speed in developing a new protocol stack from scratch and problems of implementing similar functions at multiple layers, the present invention provides a method of an assembled communication protocol stack.

SUMMARY OF THE INVENTION

An objective of the present invention lies in that in order to overcome the above problems, the present invention provides a method of an assembled communication protocol stack, and the method solves the problem of slow speed in developing a new protocol stack from scratch and the problem that similar functions might be implemented at multiple layers.

In order to achieve the above objective, the present invention provides a communication method based on an assembled communication protocol stack comprising:

constructing protocol modules according to a communication protocol, and placing the protocol modules into a protocol module library;

extracting required protocol modules from the protocol module library, and assembling the extracted protocol modules to form a communication protocol stack;

installing the assembled communication protocol stack onto a protocol stack running device; and implementing a data communication by an application on the protocol stack running device using the installed protocol stack.

Optionally, the constructing protocol modules specifically comprises:

constructing execution codes of protocols corresponding to an operating system to form protocol modules; and defining PDUs, that is, a corresponding data length and data structure when each protocol module is in a mutual input/output relationship with other protocol modules in the protocol module library.

Further optionally, the communication method further comprises: establishing a relationship among protocol modules to be assembled by visually dragging or configuring a file, according to a compatibility of the protocol modules; and generating a protocol stack configuration file and a protocol stack execution file after the assembly is completed.

Optionally, the communication method further comprises: deploying the protocol stack configuration file and the protocol stack execution file onto the protocol stack running device; and initiating to run the protocol stack execution file on the protocol stack running device, to transfer data obtained by a network hardware or a virtual hardware to the protocol stack, then to obtain a name and version number of a network card drive, wherein a network protocol stack has different adaption interfaces for different network card drives and versions.

Optionally, that the protocol stack provides a communication service to an application utilizing the protocol stack, specifically means that the protocol stack provides an API file and an API library described in xml, and various protocol modules each have interfaces for providing services outward; and various applications call, through the API file and the API library, an interface function to implement the connection communication or encrypted communication.

In addition, the present invention also provides a communication system based on an assembled communication protocol stack comprising:

a protocol module library configured for selecting a communication protocol based on functions to be implemented and constructing protocol modules according to the selected communication protocol, and placing the constructed protocol modules into the protocol module library;

an assembling module configured for extracting required protocol modules from the protocol module library, and assembling the extracted protocol modules to form a communication protocol stack;

a mounting and installing module configured for installing the assembled communication protocol stack onto a protocol stack running device.

Optionally, the constructing module further comprises:

an execution code generating sub-module configured for constructing execution codes of protocol modules which correspond to an operating system and implement the required functions;

a PDU defining sub-module configured for defining PDUs, that is, a corresponding data length and data structure when each protocol module is in a mutual input/output relationship with other protocol modules in the protocol module library, for various protocol modules.

Further optionally, the assembling module further comprises:

a relationship among protocol modules establishing module configured for establishing a relationship among protocol modules to be assembled according to a compatibility of the protocol modules, by visually dragging or configuring a file;

a protocol stack configuration and execution file generating sub-module configured for generating a protocol stack configuration file and a protocol stack execution file according to an assembling relationship after the assembly is completed.

Optionally, the mounting and installing module further comprises:

a deploying sub-module configured for deploying the protocol stack configuration file and the protocol stack execution file onto the protocol stack running device:

a running sub-module configured for initiating to run the protocol stack execution file on the protocol stack running device, to transfer data obtained by a network hardware or a virtual hardware to the protocol stack, then to obtain a name and version number of a network card drive, wherein a network protocol stack sets different adaption interfaces for different network card drives and versions.

Compared with the existing methods, the present invention has the following advantages: the present invention solves the problem of slow speed in developing a new protocol stack from scratch and the problem that similar functions might be implemented at multiple layers.

DETAILED DESCRIPTION OF THE INVENTION

Figure 1:
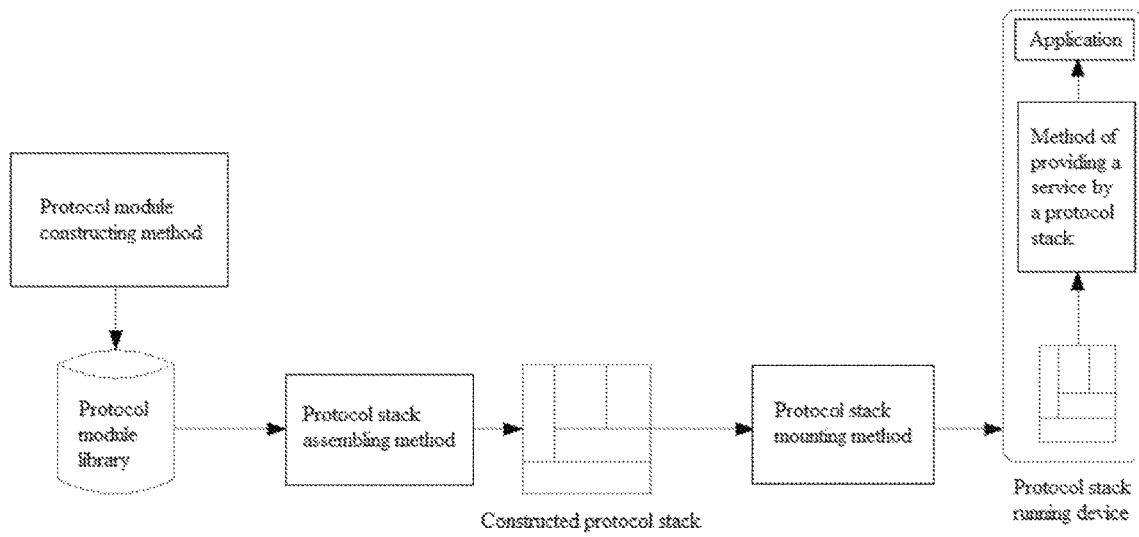
FIG. 1 is a relationship diagram of entities and methods involved in an assembled communication protocol stack.

Hereinafter, the technical solutions of the present invention will described in further detail through the accompanying drawings and embodiments.

In order to achieve the above objective, the present invention provides a communication method based on an assembled communication protocol stack comprising constructing protocol modules, assembling a protocol stack, mounting the protocol stack and providing a service by using the mounted protocol stack to implement a communication. The method of the present invention relates to the following entities: a protocol module library, a protocol stack running device, and an application using protocol stack services. The protocol module library is configured as a location for storing formed protocol modules, and may be a data library, a folder and so on. The protocol stack running device refers to a device in which the protocol stack runs, and implements operations such as calculation, packaging and verification related to the communication. The protocol stack running device may be a computer host/server/mobile device (a mobile phone, tablet, digital assistant, etc.) or a router/switch. The application using protocol stack services refers to a software entity on an end device which implements data transfer utilizing a communication function of the protocol stack, and may exist individually or may be an integral part of a certain software entity.

The constructing protocol modules described above refers to a method for generating protocol modules which implement particular functions by utilizing an existing software tool. How to write such protocol modules belongs to the prior art, no details thereof will be described here. The present invention provides an input/output relationship when a relationship between protocol modules occurs. That is, the present invention defines a PDU (Protocol Data Unit) for communication between protocol modules. The PDU is comprised of different fields, each of which is defined in a form of (data, length), and the entire PDU is defined in an xml file. Three files are associated with each protocol module: an executable file, a PDU-defined file and a module specification file. In some embodiments the executable file comprises codes executable under a respective operating system. An input/output PDU-defined file is divided into two sections: an input section and an output section. The two parts have the same structure and different uses. Both of the two parts indicate a data length and data structure, and may employ a similar manner for defining a structure (struct) in C/C++. The module specification file is for being viewed by the users.

The assembling a protocol stack described above means that a relationship (such as sequence) among the required modules is established by utilizing modules in an existing module library and visually dragging or configuring a file. In some embodiments the compatibility of the modules may be checked after the file is visually dragged, those incompatible modules cannot be linked, and a configuration file results from the visually dragging; wherein, a post-linking processing is required when the configuration file is used, so as to check the compatibility. The configuration file is a basis for a protocol module scheduler to execute a protocol. After the assembly is completed, a protocol stack configuration file and a protocol stack execution file (containing a module scheduler and various modules therein) are generated.

The mounting the protocol stack described above means that the protocol stack configuration file and the protocol stack execution file are deployed onto the protocol stack running device, and the protocol stack execution file is initiated to run on the protocol stack running device. Such operations are to be executed on the protocol stack running device so as to transfer data obtained by a network hardware (or a virtual hardware) to the protocol stack; to obtain a name and version number of a network card drive. A network protocol stack has different adaption interfaces for different network card chives and versions.

The providing a service by using the mounted protocol stack described above means that the protocol stack provides a communication service to an application utilizing the protocol stack, and provides an API file and an API library described in xml. In the constructed protocol stack, various modules each have interfaces for providing services outward, and these interfaces output in the manner described above. The application may call, through the API file and the API library, an interface function to implement required functions, such as connecting a communication, encrypting a communication and so on.

A flow of the communication method based on an assembled communication protocol stack provided by the present invention is as follows:

(1) constructing, by using a protocol module constructing method, protocol modules, and placing the protocol modules into a protocol module library;

(2) extracting respective modules from the protocol module library and assembling the respective modules to form a communication protocol stack, by using a protocol stack assembling method;

(3) installing, by utilizing a protocol stack mounting method, the constructed communication protocol stack onto a protocol stack running device;

(4) implementing, in the protocol stack running device, a data communication function by an application using a method of providing a service by the protocol stack.

Hereafter, the method of an assembled communication protocol stack provided by the present invention will be set forth further in conjunction the accompanying drawings and examples.

EXAMPLES

The method of an assembled communication protocol stack is illustrated below in conjunction with FIG. 1, FIG. 2 and FIG. 3. As illustrated in FIG. 3, it is a scenario handled by a new protocol, wherein a reliable communication is required between a remote entity and a local entity. It has been proved that the existing TCP/IP protocol stack cannot handle such a scenario, and a new type of protocol or protocol stack is required to be developed. In this scenario, it is assumed that the problem that the existing. TCP/IP protocol cannot be employed is caused by a timeout mechanism and end-to-end mechanism inherent in TCP (the actual situation will be much more complex). Therefore, it is required to develop a new multi-segment transmission control mechanism and message state buffer management mechanism. In order to test these mechanisms, it is required to provide a communication protocol stack in which these mechanisms are carried out. It can be seen from the above, only message processing parts in a transmission control layer and a routing device are changed here, thus the protocol components and framework other than TCP in the existing TCP/IP stack may be utilized and placed into the protocol module library, which is merely for illustrating the usage of the present invention and does not limit the present invention.

Figure 2:
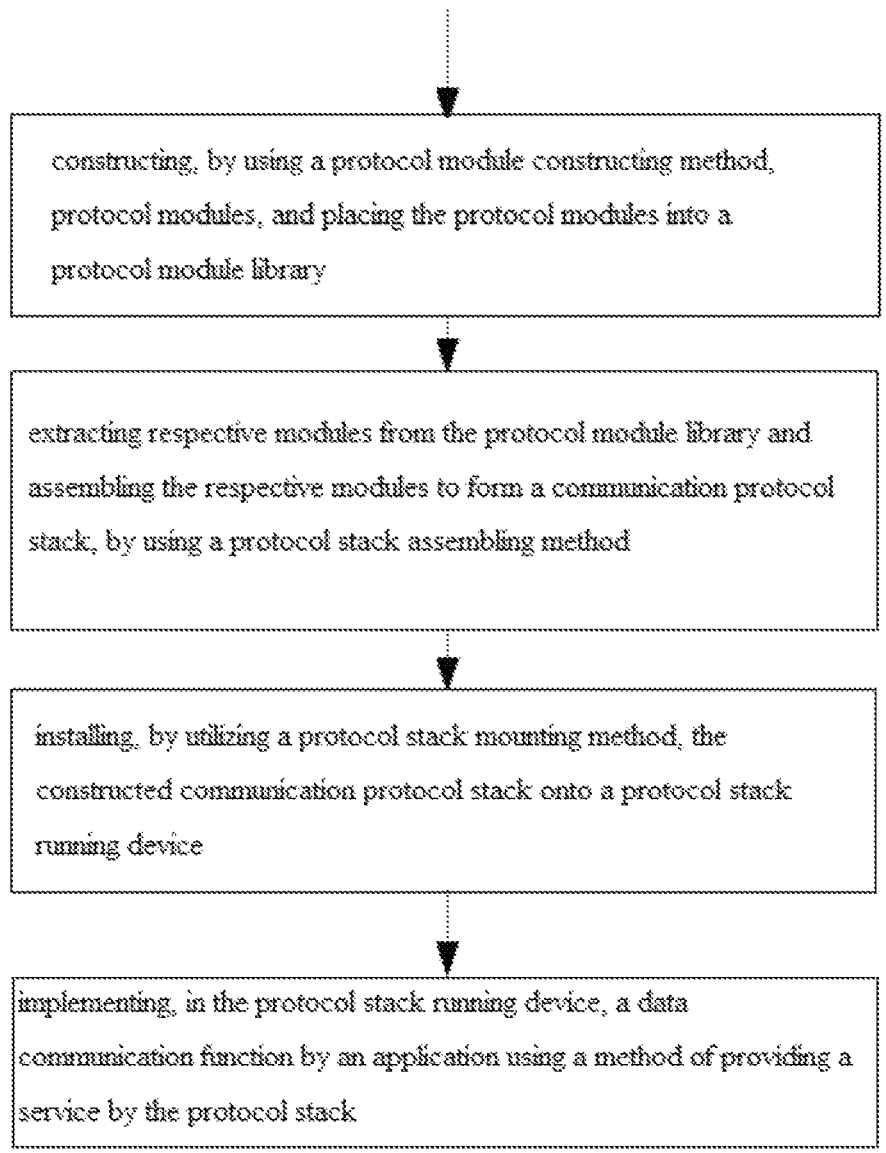
FIG. 2 is a flow of using a method of an assembled communication protocol stack.
Figure 3:
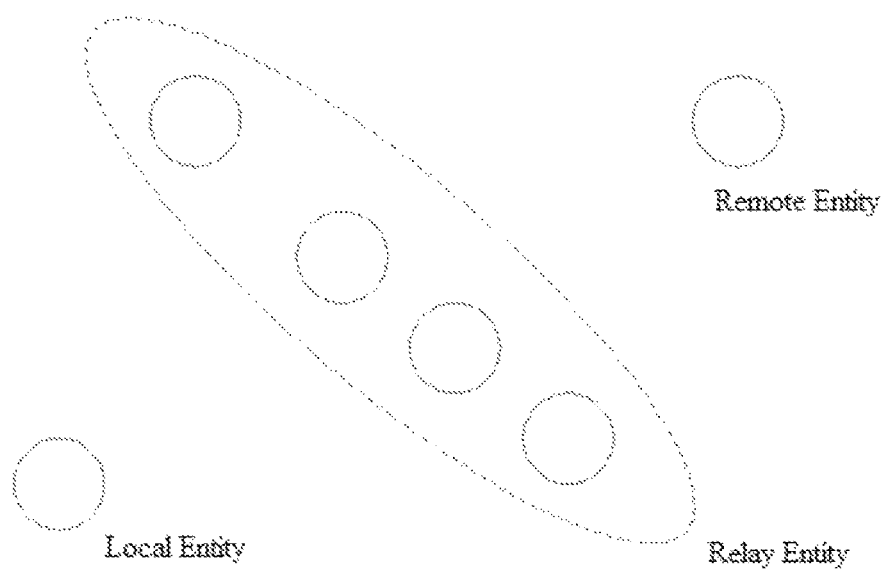
FIG. 3 illustrates a scenario of constructing a routing protocol stack utilizing an assembled communication protocol stack.

In addition, referring to FIG. 1 and FIG. 2, it is assumed that various protocol modules in the TCP/IP protocol stack have been all placed into a protocol stack module library. At this time, only a multi-segment transmission control protocol module (the TCP protocol is an end-to-end protocol, and the multi-segment transmission control protocol refers to a transmission control involving an intermediate node between two endpoints) is needed to be developed, and placed into the protocol stack module library; respective modules are extracted from the protocol module library and assembled into astronomical distance reliable communication protocol stack, by using a protocol stack assembling method; the constructed communication protocol stack are installed, by a protocol stack mounting method, onto a local entity, a remote entity and a relay entity; a data communication verification in the local entity and the remote entity is implemented by an application using a method of providing services by the protocol stack. According to test results, the multi-segment transmission control protocol module can be modified.

For those skilled in the art, the rest in the specification can be technically implemented, no details thereof will be described here.

Finally, it should be noted that the aforementioned embodiments are only used for illustrating, rather than limiting the technical solution of the present invention.

Although the present invention has been described in detail with reference to the embodiments, those skilled in the art should understand that modifications or equivalent substitutions can be made to the technical solution of the present invention without departing from the scope and spirit of the technical solution of the present invention, and thereby should all be covered by the scope of the claims of the present invention.

What is claimed is:

1. A communication method based on an assembled communication protocol stack, comprising:
    constructing a first plurality of protocol modules according to a plurality of communication protocols using a software tool in a protocol stack running device, and placing the first plurality of protocol modules into a protocol module library, wherein the first plurality of protocol modules are selected from a TCP/IP protocol stack, and the protocol stack running device is a computer host, a server, a router or a switch;
    extracting a second plurality of protocol modules from the protocol module library based on a required communication protocol, and assembling the second plurality of protocol modules to form a communication protocol stack by using a dragging tool or a configuration file of the protocol stack running device; wherein the communication protocol stack comprises a multi-segment transmission control protocol module;
    installing the communication protocol stack in the protocol stack running device; and
    implementing a data communication by an application in the protocol stack running device using the communication protocol stack;
    wherein
    the constructing the first plurality of protocol modules further comprises:
    constructing a plurality of execution codes of the plurality of communication protocols corresponding to an operating system to form the first plurality of protocol modules; and
    defining PDUs (protocol data units) for communications between the first plurality of protocol modules, wherein each of the PDUs has a corresponding data length and a data structure when each protocol module of the first plurality of protocol modules is in a mutual input/output relationship with other protocol modules of the first plurality of protocol modules in the protocol module library.

2. The communication method based on the assembled communication protocol stack according to claim 1, wherein,
    establishing a relationship among the second plurality of protocol modules to be assembled by visually dragging or configuring a file, according to a compatibility of the second plurality of protocol modules; and
    generating a protocol stack configuration file and a protocol stack execution file after an assembly is completed.

3. The communication method based on the assembled communication protocol stack according to claim 1, wherein,
    deploying a protocol stack configuration file and a protocol stack execution file in the protocol stack running device; and
    initiating to run the protocol stack execution file on the protocol stack running device, to transfer data obtained by a network hardware or a virtual hardware to the communication protocol stack, then to obtain a name and a version number of a network card drive, wherein a network protocol stack comprises different adaption interfaces for different network card drives and versions.

4. The communication method based on the assembled communication protocol stack according to claim 1, further comprises:
   providing, by the communication protocol stack, a communication service to the application utilizing the communication protocol stack, wherein the communication protocol stack provides an API file and an API library described in xml, and each of the second plurality of protocol modules comprises an interface for providing a plurality of services outward; and
   implementing, by the application, a connection communication or an encrypted communication through calling an interface function and through the API file and the API library.

5. A communication system based on an assembled communication protocol stack, comprising:
   a protocol module library configured for selecting a plurality of communication protocols based on a function to be implemented and constructing a first plurality of protocol modules according to the plurality of communication protocols, and placing the first plurality of protocol modules into a protocol module library;
   an assembling module configured for extracting a second plurality of protocol modules from the protocol module library according to a specific application scenario, and assembling the second plurality of protocol modules to form a communication protocol stack;
   a mounting and installing module configured for installing the communication protocol stack in a protocol stack running device, wherein the protocol stack running device is a computer host, a server, a router or a switch, and the protocol stack running device comprises an application for implementing a data communication;
   wherein the protocol module library further comprises:
   an execution code generating sub-module configured for constructing a plurality of execution codes of the plurality of protocol modules corresponding to an operating system and implementing required functions;
   a PDU defining sub-module configured for defining a plurality of PDUs for the second plurality of protocol modules, wherein each of the plurality of PDUs is a corresponding data length and a data structure when each protocol module of the second plurality of protocol modules is in a mutual input/output relationship with other protocol modules of the second plurality of protocol modules in the protocol module library.

6. The communication system based on the assembled communication protocol stack according to claim 5, wherein the assembling module further comprises:
   a protocol modules relationship establishing module, configured for establishing a relationship among the second plurality of protocol modules to be assembled according to a compatibility of the second plurality of protocol modules, by visually dragging or configuring a file;
   a protocol stack configuration and execution file generating sub-module, configured for generating a protocol stack configuration file and a protocol stack execution file according to an assembling relationship after an assembly is completed.

7. The communication system based on the assembled communication protocol stack according to claim 5, wherein the mounting and installing module further comprises:
   a deploying sub-module, configured for deploying a protocol stack configuration file and a protocol stack execution file in the protocol stack running device;
   a running sub-module, configured for initiating to run the protocol stack execution file on the protocol stack running device, to transfer data obtained by a network hardware or a virtual hardware to the communication protocol stack, then to obtain a name and a version number of a network card drive, wherein a network protocol stack sets different adaption interfaces for different network card drives and versions.

* * * * *